United States Patent [19]

Torenbeek et al.

[11] Patent Number: 5,260,390
[45] Date of Patent: Nov. 9, 1993

[54] PEROXIDE EMULSIONS CONTAINING AN ANTIFREEZING COMPOUND

[75] Inventors: Reinder Torenbeek, Le Twello; Willem F. Verhelst, Gorssel, both of Netherlands

[73] Assignee: Akzo N.V., Netherlands

[21] Appl. No.: 8,894

[22] Filed: Jan. 25, 1993

Related U.S. Application Data

[60] Continuation of Ser. No. 336,063, Apr. 11, 1989, abandoned, which is a continuation of Ser. No. 578,594, Feb. 10, 1984, Pat. No. 4,950,422, which is a continuation of Ser. No. 534,264, Sep. 21, 1983, abandoned, which is a division of Ser. No. 417,759, Sep. 13, 1982, abandoned, which is a division of Ser. No. 222,844, Jan. 6, 1981, abandoned.

[30] Foreign Application Priority Data

Jan. 16, 1980 [NL] Netherlands .................. 8000260

[51] Int. Cl.⁵ ............................................. B01J 31/02
[52] U.S. Cl. .................................. 526/200; 526/202; 526/230.5; 526/344.2; 502/160
[58] Field of Search ................ 252/426; 526/200, 202, 526/230.5, 344.2

[56] References Cited

U.S. PATENT DOCUMENTS

| | | |
|---|---|---|
| 2,648,655 | 8/1953 | Vandenberg . |
| 2,648,656 | 8/1953 | Vandenberg . |
| 2,665,269 | 1/1954 | Reynolds et al. . |
| 2,837,502 | 6/1958 | Hammer et al. . |
| 2,932,628 | 4/1960 | Uraneck et al. . |
| 3,029,229 | 4/1962 | Doell . |
| 3,067,186 | 12/1962 | Bessant et al. . |
| 3,182,026 | 5/1965 | Leveskis . |
| 3,254,033 | 5/1966 | Welch . |
| 3,312,678 | 4/1967 | Crano . |
| 3,324,097 | 6/1967 | Pears . |
| 3,507,800 | 4/1970 | Leveskis . |
| 3,535,422 | 10/1970 | Cox et al. ............... 424/164 |
| 3,631,009 | 12/1971 | Meyer . |
| 3,825,509 | 7/1974 | Miller . |
| 3,988,261 | 10/1976 | Barter et al. . |
| 4,039,475 | 8/1977 | Oosterwijk et al. ........... 252/426 |
| 4,043,940 | 8/1977 | Sanchez . |
| 4,052,465 | 10/1977 | Roskott et al. . |
| 4,058,495 | 11/1977 | Serratore et al. . |
| 4,076,920 | 2/1978 | Mikofalvy et al. . |
| 4,105,584 | 8/1978 | Norback et al. ............ 252/426 |
| 4,286,081 | 6/1981 | Mikofalvy ................ 526/212 |
| 4,374,057 | 2/1983 | Goodman et al. ........... 252/426 |

FOREIGN PATENT DOCUMENTS

| | | |
|---|---|---|
| 2418386 | 10/1974 | Fed. Rep. of Germany . |
| 2634131 | 2/1977 | Fed. Rep. of Germany . |
| 2629467 | 1/1978 | Fed. Rep. of Germany . |
| 1095914 | 12/1967 | United Kingdom . |
| 1180363 | 2/1970 | United Kingdom . |

OTHER PUBLICATIONS

Japanese Patent Abstract, 3367/1970.
Japanese Patent Abstract, 38682/1973.
Japanese Patent Abstract, 3984/1978.
Pennwalt Lucidol Product Bulletin 5.301, Lupersol® 223 and Lupersol® 223-M, Jan. 1970, pp. 1–5.
Pennwalt Lucidol Product Bulletin 5.201, Lupersol® 225 and Lupersol® 225-M, Apr. 1969, pp. 1–5.
Pennwalt Lucidol Product Bulletin 6.501, Lupersol® 11, Dec. 1966, pp. 1–4.
"Organic Peroxides, Diisopropyl Peroxydicarbonate," Strong, W. A., *Industrial and Engineering Chemistry*, vol. 56, No. 12, pp. 33–38, Dec. 1964.
"Esters of Peroxycarbonic Acids," Strain et al., *Journal of the American Chemical Society*, vol. 72, pp. 1254–1263, Mar. 1950.
Chemical Abstracts, vol. 88, 21811X, (1978).
"Journal of General Chemistry of the USSR", vol. 30, No. 7 (1960), pp. 2368–2373.
"Journal of Organic Chemistry of the USSR", vol. 13, No. 9, Part 1, pp. 1741–1744 (1977).
Chemical Abstracts "Synthetic High Polymers", vol. 76, 6018 n, p. 9, 1972.
Minato et al. "Journal of Polymer Science", Part C, No. 23, pp. 761–764 (1968).

*Primary Examiner*—Jacqueline V. Howard
*Attorney, Agent, or Firm*—Oliff & Berridge

[57] ABSTRACT

This disclosure relates to aqueous peroxide emulsions and the use thereof in suspension (co)polymerization reactions. In particular, the aqueous peroxide emulsions comprise: a) 20–60% by weight of an organic peroxide which is liquid at −5° C.; b) 2–20% by weight of an aliphatic monohydric alcohol having 1–4 carbon atoms and/or aliphatic glycol having 2–4 carbon atoms; c) a surfactant and/or a protective colloid; and d) water. The emulsions of the present disclosure may be transported while in a liquid state at a temperature of −10° C. to −25° C. with minimal decrease in active oxygen content.

10 Claims, No Drawings

PEROXIDE EMULSIONS CONTAINING AN ANTIFREEZING COMPOUND

This is a continuation of application Ser. No. 07/336,063, filed Apr. 11, 1989, now abandoned, which in turn is a continuation of application Ser. No. 06/578,594, filed Feb. 10, 1984, now U.S. Pat. No. 4,950,422, which in turn is a continuation of application Ser. No. 06/534,264, filed Sep. 21, 1983, now abandoned, which in turn is a division of application Ser. No. 06/417,759, filed Sep. 13, 1982, now abandoned, which in turn is a division of application Ser. No. 06/222,844, filed Jan. 6, 1981, now abandoned.

The present invention relates to aqueous peroxide emulsions, and the use thereof in suspension (co)polymerization reactions.

BACKGROUND OF THE INVENTION

U.S. Pat. No. 3,825,509 describes an aqueous emulsion obtained by emulsifying an organic peroxide in an aqueous solution containing 1-5% by weight of polyvinyl alcohol and 1-6% by weight of polyoxyethylene sorbitan monolaurate. However, such emulsions lack physical stability and at organic peroxide concentrations higher than 19% by weight these emulsions become viscous and difficult to handle. U.S. Pat. No. 3,988,261 describes aqueous peroxide emulsions consisting of 30-75% by weight of an organic peroxide; an emulsifying amount of a water-soluble surfactant; and water. These emulsions are stable to freeze-thaw cycles and therefore the emulsions are generally frozen for transportation and subsequently thawed before use. As a result these frozen peroxide emulsions are relatively safe and easy to handle and transport. The safe handling of such emulsions is due in part to the fact that frozen emulsions offer a large self-contained heat sink because of a latent heat of fusion of the water component.

However, the use of such frozen emulsions has several disadvantages. Due to the fact that in actual practice large quantities of frozen emulsions are generally stored, if the frozen emulsion is exposed to a rapidly rising ambient temperature, the relatively large heat sink and the low heat conductivity of ice will initially give rise only to the melting of the outermost portion of the frozen emulsion. Because of the difference between the conductivity of the liquid emulsion and the frozen emulsion, the temperature of the small amount of liquid peroxide emulsion produced will rapidly rise. Under such circumstances the frozen emulsion will produce the uncontrolled decomposition of the peroxide rather than non-frozen, aqueous emulsions. In addition the frozen emulsion particles tend to aggregate, and as a result lithe particle size of the resulting emulsion will be considerably increased.

Furthermore, procedures employing frozen emulsions require several additional steps which are undesirable in practical applications. Initially, the emulsion must be frozen. Then before it can be used, the emulsion is thawed. Such thawing procedures require the utmost care. In addition, in view of the general instability of peroxides, the thawed emulsions must be rapidly processed. If this is not possible, the activity of the thawed peroxide emulsion will decrease rapidly. Although frozen emulsions may be employed in this solid form, metering of solid substances is difficult to automate and the fusion of the emulsion particles may make it difficult to obtain the correct feed rate.

Conventional emulsions contain, in addition to peroxide, generally surfactants, protective colloids and water. The incorporation in these emulsions of additional substances such as alkanols and alkane diols is considered objectionable in view of the possible negative influence thereof on the peroxide and the resulting polymer. For example, it has been noted that the addition of 0.5% to 2% by weight of 2-ethylhexanol to di-2-ethyl hexyl peroxydicarbonate causes the active oxygen content to decrease by 30 to 40% after two months storage at 0° C. For samples not containing the alcohol, the decrease in active oxygen content was 5%. Furthermore, such alcohols may serve as chain transfer agents when utilized in (co)polymerization reactions of ethylenically unsaturated compounds and as a result cause a decrease in the molecular weight of the polymer.

German Patent Application 2,418,386 describes aqueous suspensions that contain 1-30%, by weight of benzoyl peroxide, 1-30% by weight of surfactant and 10-80% by weight of an alcohol However in a suspension, unlike an emulsion, the risk of alcohol diffusing the peroxide is generally not expected. In addition, benzoyl peroxide is a member of a considerably stabler class of compounds than the present peroxides. German Patent Application 2,629,467 describes aqueous dispersions of solid oil-soluble radical initiators that are stable when stored at a temperature above −5° C. and may contain substances that decrease the melting point. The present invention, however, relates to emulsions of organic peroxides that are generally unstable at temperatures greater than −5° C.

SUMMARY OF THE INVENTION

The aqueous peroxide emulsions of the present invention comprise: a) 20-60% by weight of an organic peroxide which is liquid at −5° C.; b) 2-20% by weight of an alkanol having 1—4 carbon atoms and/or alkane diol having 2-4 carbon atoms; c) a surfactant and/or protective colloid; and d) water.

The emulsions of the present invention may be utilized in the suspension (co)polymerization of ethylenically unsaturated compounds such as, for example, vinyl chloride.

DESCRIPTION OF THE INVENTION

The aqueous peroxide emulsions according to the present invention employ 20-60% by weight and preferably 30-50% by weight of an organic peroxide which is liquid at −5° C. Organic peroxides employed in the emulsions of the present invention include peroxides of the formula:

wherein, $R_1$ is a tertiary alkyl group having 4-9 carbon atoms or a phenoxymethyl group; and $R_2$ is an alkyl group having 4-8 carbon atoms or a cumyl group and peroxydicarbonates of the formula:

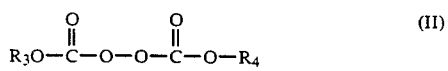

wherein, $R_3$ and $R_4$ are independently alkyl having 3-8 carbon atoms or substituted alkyl substituted with one or more alkoxy groups having 1-3 carbon atoms.

The alkyl groups represented by $R_1$, $R_2$, $R_3$ or $R_4$ may be branched or straight chain.

Examples of suitable peresters include, tertiarybutylperoxypivalate, tertiaryamylperoxypivalate, tertiarybutylperoxyneodecanoate, cumylperoxyneodecanoate, and 2, 4, 4- trimethylpentyl-peroxyphenoxyacetate. It is preferred to employ a peroxydicarbonate of formula (II) as the organic peroxide in the emulsion of the present invention. Examples of peroxydicarbonates for formula (II) include: di-n-propyl-peroxydicarbonate, di-n-butyl peroxydicarbonate, di-sec-butylperoxydicarbonate, di-2-ethylhexylperoxydicarbonate, di-3-methoxybutylperoxydicarbonate and di-2-ethoxyethylperoxydicarbonate.

In addition to an organic peroxide, the aqueous emulsions of the present invention employ 2-20% by weight and preferably 5-15% by weight of an alkanol having 1-4 carbon atoms and/or an alkane diol having 2-4 carbon atoms. The presence of such alcohols in the emulsions of the present invention produces a substantial decrease in the melting point of the emulsions. The emulsions of the present invention are liquids within a temperature range of $-10$ C. to $-25°$ C. At very low temperatures, some of the peroxides employed in the present invention may become solid. However, this does not have any adverse effect on the stability of the resulting compositions and for convenience, such compositions are referred to as emulsions. If less than 2% by weight of an alcohol is added, a decrease in the freezing point of the resulting emulsion is noted but the decrease is too small for practical purposes. Adding more than 20% by weight of an alcohol may result in emulsions which may become inflammable. Representative of alcohols employed in the emulsions of the present invention include, for example, methanol, ethanol, isopropanol, n-butanol, ethylene glycol, propylene glycol and butylene glycol. It is preferred that the emulsions employ methanol.

The emulsions of the present invention generally employ 0.01-10% by weight and preferably 0.05-5% by weight of a surfactant and/or protective colloid. Suitable surfactants and/or protective colloids are described in U.S. Pat. No. 3,988,261. Examples of surfactants and/or protective colloids include, anionic surfactants such as carboxylates, sulphonates, sulphates, sulphated products and phosphate esters; nonionic surfactants such as ethoxylated alkylphenols, ethoxylated aliphatic alcohols, carboxylic esters, carboxylic amides, polyoxyalkylene oxide block copolymers and polyvinyl alcohol, cationic surfactants and water-soluble cellulose ethers.

The aqueous peroxide emulsions of the present invention are prepared in accordance with known techniques and employing equipment commonly utilized for such purposes (for example U.S. Pat. No. 3,988,261).

The order in which the components of the emulsions of the present invention are added is not critical. Generally, the surfactant and/or the protective colloid are dissolved in water, followed by the successive addition of the alcohol and then organic peroxide. The organic peroxide, because of its instability, is usually added at a temperature below 5° C. The emulsion is agitated employing convertional emulsification equipment. It is preferred that the peroxide be emulsified in the aqueous medium. However, if desired the peroxide may be dissolved in an organic solvent such as an aliphatic hydrocarbon, which may be dispersed into the aqueous medium.

The particle size of the resulting emulsions is generally below 10 um and preferably below 1 um.

The aqueous peroxide emulsions of the present invention may be employed in the suspension (co)polymerization of ethylenically unsaturated compounds. Illustrative ethylenically unsaturated compounds include, for example, butadiene, isoprene, 1,4-pentadiene, 1,6-hexadiene, 1,7-octadiene;, polymerizable ethylenically unsaturated monomers, such as styrene or substituted styrenes, such as methyl styrene, 2,4-dimethyl styrene, ethyl styrene, isopropyl styrene, butyl styrene, phenyl styrene, cyclohexyl styrene, benzyl styrene, styrenes substituted with one or more halogen atoms, such as chlorostyrene, 2,5-dichlorostyrene, bromostyrene, fluorostyrene trifluromethyl styrene, iodostyrene; styrenes substituted with one or more functional groups, such as cyanostyrene, nitrostyrene, acetostyrene, phenoxystyrene; acryl monomers and substituted acryl monomers, such as acrylic acid, methacrylic acid and the esters thereof having 1-18 carbon atoms, cyclohexyl(meth)acrylate, benzyl (meth)acrylate, isopropyl (meth)acrylate, butyl acrylate, 2-ethylhexylacrylate, phenyl(meth)acrylate; acrylonitrile, methacrylonitrile; vinyl esters and substituted vinyl esters derived from carboxylic acids containing 1-18 carbon atoms, such as vinyl formate, vinyl acetate, chlorovinyl acetate, vinyl butyrate, vinyl methoxyacetate, vinyl benzoate, methyl-4-vinyl benzoate, isopropenyl acetate; vinyl esters derived from unsaturated carboxylic esters containing 1-8 carbon atoms, such as vinyl acrylate, vinyl methacrylate; vinyl halides, such as vinyl fluoride, vinylidene fluoride, vinylidene chloride, vinyl bromide, vinylidene bromide, vinyl iodide; vinyl compounds having functional groups, such as p-vinylidene sulphide, p-vinylphenyl oxide, vinyl pyridine ether, vinylbutyl ether, vinyl-2-ethylhexyl ether, vinylphenyl ether, vinyl ketones, such as vinylethyl ketone, vinylphenyl ketone; allyl esters derived from carboxylic acids containing 1-18 carbon atoms; and vinyl chloride. It is preferred that the present aqueous emulsion be employed in the suspension polymerization of vinyl chloride. Such suspension (co)polymerizations are generally carried out employing techniques known to one of ordinary skill in art.

The following examples serve to illustrate the present invention.

EXAMPLE 1

In 478 g of water at 40° C. were dissolved 20 g of ethoxylated nonylphenol and 2 g of xanthane gum. To the resulting solution was added 100 g of methahol. The mixture solution was cooled to 2° C., then 400 g of di-2-ethylhexyl peroxydicarbonate was added.

The composition produced is a liquid emulsion capable of being transported at a temperature of $-10°$ C. In addition, the peroxide is stable at this temperature; i.e., after 6 months storage, the active oxygen content decreased by only 2%.

EXAMPLE 2

The procedure described in Example 1 was employed utilizing 400 g of di-sec. butyl peroxydicarbonate in lieu of di-ethylhexyl peroxydicarbonate. The composition produced is a liquid emulsion capable of being transported at a temperature of $-10°$ C. The peroxide was stable at this temperature, i.e., after 6 months the active oxygen content had decreased by only 2%.

EXAMPLE 3

In 448 g of water of 40° C. were dissolved 20 g of ethoxylated nonyl phenol and 2 g of xanthan gum. To the resulting solution was added 130 g of ethanol. The resultant mixture was cooled to 2° C., then 400 g of di-2-ethylhexyl peroxydicarbonate was added with stirring. The composition produced could be transported as a liquid emulsion at a temperature of −10° C. After 8 weeks storage of the emulsion at this temperature the active oxygen content had decreased by only 1.0%. For di-2-ethylhexyl peroxydicarbonate without any additives this loss was 0.5%, this compound being stored over the same period and at the same temperature as the composition prepared in Example 3.

EXAMPLE 4

The procedure described in Example 3, was employed utilizing 400 g of tertiary butyl peroxyndeodecanate in lieu of di-2-ethylhexyl peroxydicarbonate. The resultant composition could be transported as a liquid emulsion at a temperature of −10° C. The peroxide displayed the same stability as the peroxide in Example 3.

EXAMPLE 5

The procedure described in Example 3, was employed-utilizing 388 g of water and 190 g of ethylene glycol in lieu of 448 g of water and 130 g of ethanol. The resultant composition could be transported as a liquid emulsion at a temperature of −10° C. The stability of the peroxide was the same as obtained for the peroxide in Example 3.

EXAMPLE 6

In 460 g of water of 40° C. were dissolved 20 9 of ethoxylated fatty acid alcohol and 20 g of polyvinyl alcohol. To the resulting solution was added 100 g of methanol. The resultant mixture was cooled to 2° C., then 400 g of di-ethylhexyl peroxydicarbonate was added with stirring. The composition produced could be transported as a liquid emulsion at a temperature of −10° C. After 8 weeks storage at this temperature the active oxygen content had decreased by only 1%.

Similar results were obtained when a stabilizer system made up of 20 g of ethoxylated sorbitan ester and 20 g of hydroxypropyl methyl cellulose was utilized.

EXAMPLE 7

The emulsion prepared in with Example 1 was employed in the polymerization of vinyl chloride. 0.26 g of the emulsion prepared in Example 1 was added to a mixture containing 340 g of water, 200 g of vinyl chloride and 0.2 g of polyvinyl alcohol. The polymerization reaction was carried out in a 1-liter, stirred polymerization autoclave at a temperature of 55° C.

For comparison, this experiment was repeated employing a peroxide emulsion containing water in lieu of methanol. Table 1 summarizes the results.

TABLE 1

|  | Use of the emulsion | |
|---|---|---|
|  | without methanol | with methanol |
| conversion (%) | 88 | 88 |
| apparent density (g/cm) | 0.39 | 0.40 |
| plasticizer absorption (%) | 19 | 18 |
| mean particle size | 152 | 153 |
| dry flow (g/sec) | 3.2 | 3.3 |

TABLE 1-continued

|  | Use of the emulsion | |
|---|---|---|
|  | without methanol | with methanol |
| K-value* | 68 | 68 |

*K-value is a parameter for the mol. weight of the polymer.

The results illustrate that the presence of the methanol produces no unfavourable properties with respect to the polyvinyl chloride obtained.

What is claimed is:

1. An aqueous emulsion of a polymerization initiator comprising:
   (a) 20–60% by weight of a polymerization initiator which is liquid at −5° C.;
   (b) 0.01–20% by weight of at least one member selected from the group consisting of a surfactant and a protective colloid;
   (c) at least 2% by weight of a compound selected from the group consisting of alkanols having 1–4 carbon atoms, alkane diols having 2–4 carbon atoms and mixtures thereof;
   (d) an organic solvent; and
   (e) the balance water.

2. An aqueous emulsion of a polymerization initiator as claimed in claim 1 which comprises 0.01–10% by weight of a surfactant selected from the group consisting of anionic surfactants, nonionic surfactants and mixtures thereof, and 0.01–10% by weight of a protective colloid.

3. An aqueous emulsion of a polymerization initiator as claimed in claim 1 wherein the polymerization initiator is selected from the group consisting of organic peroxides.

4. An aqueous peroxide emulsion as claimed in claim 3 wherein the organic peroxide is a peroxide selected from the class of peroxides of the formula:

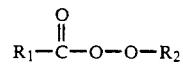

and peroxydicarbonates of the formula:

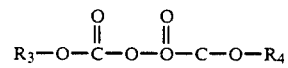

wherein $R_1$ is a tertiary alkyl group having 4–9 carbon atoms or a phenoxymethyl group; $R_2$ i san alkyl group having 4–8 carbon atoms or a cumyl group; and $R_3$ and $R_4$ are independently selected from the group consisting of an alkyl group having 3–8 carbon atoms and an alkyl group having 3–8 carbon atoms which is substituted with at least one alkoxy group having 1–3 carbon atoms.

5. An aqueous peroxide emulsion according to claim 3 wherein the emulsion comprises 2 to 20% by weight of a compound selected for the group consisting of alkanols having 1–4 carbon atoms, alkane diols having 2–4 carbon atoms and mixtures thereof.

6. An aqueous peroxide emulsion as claimed in claim 3 wherein the alkanol is methanol, the organic peroxide is di-2-ethylhexyl peroxydicarbonate and the organic solvent is a hydrocarbon.

7. A process for the production of aqueous emulsions of a polymerization initiator, comprising the steps of:

(a) forming a solution that contains from 20-60% by weight of a polymerization initiator that is liquid at −5° C.;
(b) adding said solution to an aqueous medium that comprises at least one member selected for the group consisting of a protective colloid and a surfactant, and a sufficient amount of an antifreezing compound selected from the group consisting of alkanols having 1-4 carbon atoms and alkanediols having 2-4 carbon atoms, to form an aqueous emulsion that comprises 20-60% by weight of said initiator, 0.01 to 20% by weight of said protective colloid and/or surfactant, at least 2% by weight of said antifreezing compound, and the organic solvent; and
(c) subjecting said aqueous emulsion to agitation to form a stable liquid aqueous emulsion of said initiator.

8. A process as claimed in claim 7 wherein 0.01-10% by weight of a surfactant selected from the group consisting of anionic surfactants, nonionic surfactants and mixtures thereof, and 0.01-10% by weight of a protective colloid are present in said aqueous medium to which said solution is added to form said emulsion.

9. A process as claimed in claim 7 wherein the polymerization initiator is an organic peroxide selected from the class of peroxides of the formula:

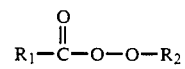

and peroxydicarbonates of the formula:

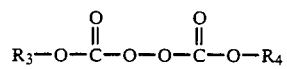

wherein $R_1$ is a tertiary alkyl group having 4-9 carbon atoms or a phenoxymethyl group; $R_2$ is an alky group having 4-8 carbon atoms or a cumyl group; and $R_3$ and $R_4$ are independently selected from the group consisting of an alkyl group having 3-8 carbon atoms and an alkyl group having 3-8 carbon atoms which is substituted with at least one alkoxy group having 1-3 carbon atoms.

10. A process as claimed in claim 9 wherein the alkanol is methanol, the organic peroxide is di-2-ethylhexyl peroxydicarbonate and the organic solvent is a hydrocarbon.

* * * * *